US011073214B2

(12) United States Patent
Georgelos et al.

(10) Patent No.: US 11,073,214 B2
(45) Date of Patent: Jul. 27, 2021

(54) DUCKBILL VALVE AND METHOD FOR MAKING A DUCKBILL VALVE

(71) Applicant: RAPAK, LLC, Bloomfield Hills, MI (US)

(72) Inventors: Paul N. Georgelos, Naperville, IL (US); Kosmas Kasimatis, Chicago, IL (US); Ronald E. Kieras, Woodstock, IL (US); Matt Ruschmeier, Glencoe, MN (US)

(73) Assignee: RAPAK, LLC, Bloomfield Hills, MI (US)

( * ) Notice: Subject to any disclaimer, the term of this patent is extended or adjusted under 35 U.S.C. 154(b) by 0 days.

(21) Appl. No.: 16/370,088

(22) Filed: Mar. 29, 2019

(65) Prior Publication Data
US 2020/0309273 A1 Oct. 1, 2020

(51) Int. Cl.
| F16K 7/02 | (2006.01) |
| B29C 45/00 | (2006.01) |
| B29K 21/00 | (2006.01) |
| B29L 31/00 | (2006.01) |

(52) U.S. Cl.
CPC ............ *F16K 7/02* (2013.01); *B29C 45/0001* (2013.01); *B29C 45/0055* (2013.01); *B29K 2021/003* (2013.01); *B29L 2031/7506* (2013.01)

(58) Field of Classification Search
CPC .................................................. B29C 45/0001
See application file for complete search history.

(56) References Cited

U.S. PATENT DOCUMENTS

| 4,426,062 | A  | * | 1/1984 | Bowron ................ F16K 15/145 239/576 |
| 6,197,143 | B1 | * | 3/2001 | Bodnar ..................... A61F 2/06 156/218 |
| 8,973,789 | B2 |   | 3/2015 | Smith et al. |
| 9,010,589 | B2 |   | 4/2015 | Thurman et al. |
| 9,119,663 | B2 | * | 9/2015 | Webb ................. A61B 17/3462 |
| 9,592,944 | B2 |   | 3/2017 | Johnson |
| 9,850,041 | B2 |   | 12/2017 | Arch et al. |
| 10,227,167 | B2 |  | 3/2019 | Darby et al. |
| 2002/0091199 | A1 | * | 7/2002 | Babb ....................... C08G 81/02 525/194 |
| 2005/0115866 | A1 | * | 6/2005 | Burns ............... H01L 21/67369 206/710 |
| 2009/0020725 | A1 | * | 1/2009 | Le .......................... B29C 45/006 251/356 |
| 2012/0187158 | A1 | * | 7/2012 | Pritchard ........... B65D 47/2031 222/501 |
| 2013/0026677 | A1 | * | 1/2013 | Smith ................ B65D 47/2031 264/255 |
| 2013/0139899 | A1 | * | 6/2013 | Galas .................. F16K 99/0026 137/12 |
| 2017/0252524 | A1 | * | 9/2017 | Kruger ................. A61M 16/208 |
| 2018/0153244 | A1 | * | 6/2018 | Kirshon .................. B29C 39/10 |
| 2019/0168918 | A1 |   | 6/2019 | Georgelos et al. |

* cited by examiner

*Primary Examiner* — Angelisa L. Hicks (74) *Attorney, Agent, or Firm* — McDonald Hopkins LLC (57) ABSTRACT

A duckbill valve includes a flexible and hollow body having a first shape upon being formed by injection molding. The body in the first shape has a first opening at a first end and a second opening at a second end. The body is configured to be inverted into a second shape. The second shape has a first opening at a first end and has a slit at a second end. The slit is defined by lips that are pressed together to form a seal.

13 Claims, 8 Drawing Sheets

DUCKBILL VALVE AND METHOD FOR MAKING A DUCKBILL VALVE

BACKGROUND

Generally, this application relates to a duckbill valve and method for making a duckbill valve.

Duckbill valves are used to seal, control flow, and regulate pressure in a host of devices in many industries. In one example, they are used in valve assemblies for flexible packaging that are designed to cooperate with equipment to dispense beverages (e.g., smoothies) at restaurants, convenience stores, etc. Such valve assemblies are configured to be secured to a fitment or spout connected to a flexible liner or bag. The assemblies may include a retaining ring that can hold a flexible duckbill valve in place in the spout. The spout is aligned with a hole in the bag through which a tube (or probe or dispenser) can be inserted into the bag to extract the contents therein. The duckbill valve is configured to accept the flexible dispensing tube through a slit in the valve to allow the flow of liquid from the bag when engaged with beverage dispensing equipment. The duckbill valve is configured to flex back to a closed state when the tube is removed from the valve.

Duckbill valves that are used in such applications (and in many other applications) typically are made of flexible thermoset silicones (which tend to be costly) and/or thermoplastic elastomers ("TPE"). TPEs are a class of copolymers that are a mix of plastic and rubber. This mix of polymers (or blend of attributes in a copolymer) results in a material with thermoplastic and elastomeric properties. Common TPEs include thermoplastic polyolefins ("TPO"), thermoplastic vulcanizates ("TPV"), thermoplastic polyurethanes ("TPU"), thermoplastic copolyesters ("TPC"), thermoplastic polyamides ("TPA") and thermoplastic styrenics ("TPS").

The utility and popularity of flexible duckbill valves stem in part from their simple construction. No moving parts are present other than the flexible valve housing itself.

Despite their simplicity, conventional manufacturing processes for duckbill valves can be expensive, time consuming, and complicated. Standard manufacture includes the steps of (i) molding of a duckbill valve out of silicone or thermoplastic material, and then (ii) cutting a slit into the molded valve. The step of cutting has to be done precisely. Thus, the two-step procedure slows production and adds cost.

SUMMARY

Certain embodiments of the present technology relate to a duckbill valve. The valve includes a flexible and hollow body having a first shape upon being formed by injection molding. The body in the first shape has a first opening at a first end and a second opening at a second end. The body is configured to be inverted into a second shape. The second shape has a first opening at a first end and has a slit at a second end. The slit is defined by lips that are pressed together to form a seal.

The duckbill valve may include interlocking structures that engage each other when the body is inverted into the second shape. The interlocking structures may include a first tab extending from a first side of the body and a second tab extending from a second side of the body, wherein, when the body is inverted into the second shape, the first and second tabs interlock with each other.

The duckbill valve in the second shape may be a two leaf duckbill valve that has one pair of lips that defines the slit. The duckbill valve in the second shape may be a three leaf duckbill valve that has three pairs of lips that define a Y-shaped slit. The duckbill valve in the second shape may be a four leaf duckbill valve that has four pairs of lips that define a cruciform shaped slit. The slit of the duckbill valve in the second shape may be defined by two half-dome shaped portions.

The duckbill valve may be made of a thermoplastic elastomer material, and the thermoplastic elastomer material may be GLS Versaflex CL30.

The slit of the valve may be configured to be opened by a probe inserted into the valve, and the lips may be configured to form a seal around the probe.

The duckbill valve may have a circular rib such that, when the valve is inverted from the first shape to the second shape, the rib applies a hoop stress to the valve body that presses the lips of the valve together in the second shape.

Certain embodiments of the present technology relate to a method for producing a duckbill valve. The method includes the steps of (i) injecting an elastomer in a fluid state into a mold to form a flexible and hollow body having a first shape, wherein the body in the first shape has a first opening at a first end and a second opening at a second end, (ii) ejecting the body in the first shape from the mold, and (iii) inverting the body by moving the first end through the second opening at the second end to form a second shape, wherein the second shape has a first opening at a first end and has a slit at a second end, the slit being defined by lips that are pressed together to form a seal.

The method may further include providing interlocking features on opposite sides of the body in the first shape and engaging the interlocking features when the body is inverted.

The slit may be defined by a pair of lips. The slit may be Y-shaped and defined by three pairs of lips. The slit may be cruciform shaped and defined by four pairs of lips.

The valve may be made of GLS Versaflex CL30. The slit may be configured to be opened by a probe inserted into the valve, and the lips may be configured to form a seal around the probe. The valve may be formed to have a circular rib, wherein, when the valve is inverted from the first shape to the second shape, the rib applies a hoop stress to the valve body such that the lips of the valve are pressed together in the second shape.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

In disclosed examples, a duckbill valve is made of TPE by an injection molding process to have a shape that is configured to be turned inside out such that, when turned inside out, the valve assembly has a desired shape for use (e.g., a two leaf, three leaf, or four leaf duckbill valve) and has a closed or sealed slit. In that regard, the valve is molded to have a hole at a first end, and when the valve is turned inside out, the hole is closed and held closed by a hoop stress applied to the structure of the valve by virtue of the valve being turned inside out. By way of example, the valves may be made of GLS Versaflex CL30 TPE.

Figure 7:
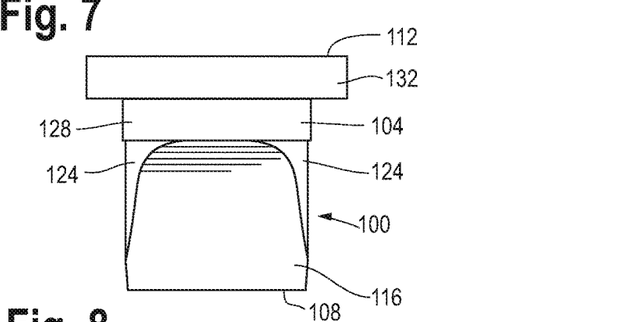
FIG. 7 illustrates a side view of the as-used valve of FIG. 5.
Figure 8:
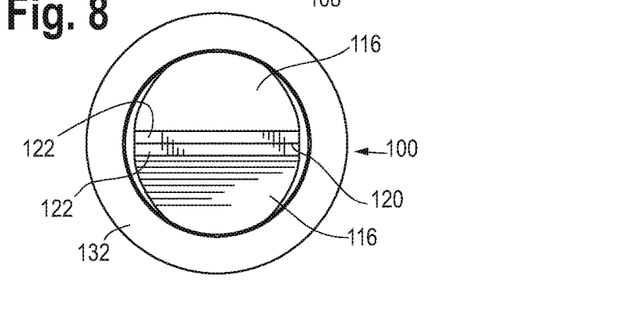
FIG. 8 illustrates a top view of the as-used valve of FIG. 5.
Figure 9:
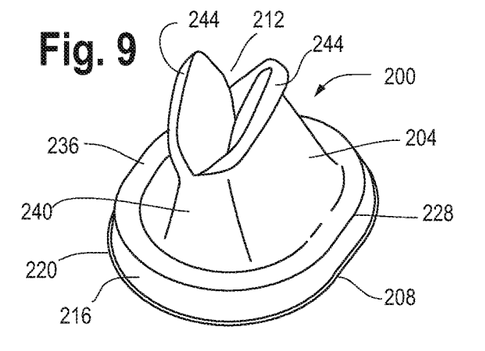
FIG. 9 illustrates an isometric view of an as-molded valve according to certain inventive techniques.
Figure 10:
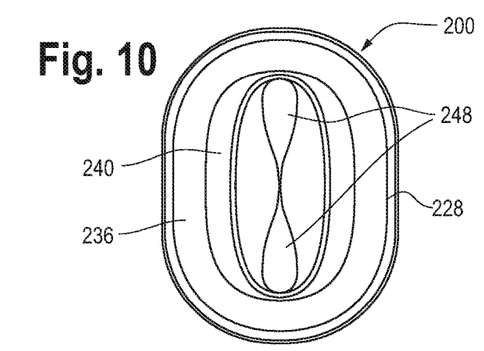
FIG. 10 illustrates a top view of the valve of FIG. 9.
Figure 11:
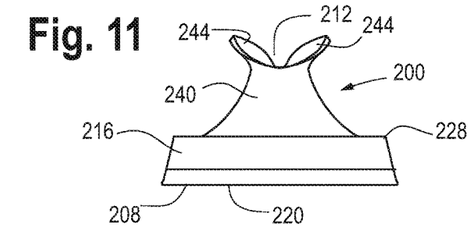
FIG. 11 illustrates a side view of the valve of FIG. 9.
Figure 12:
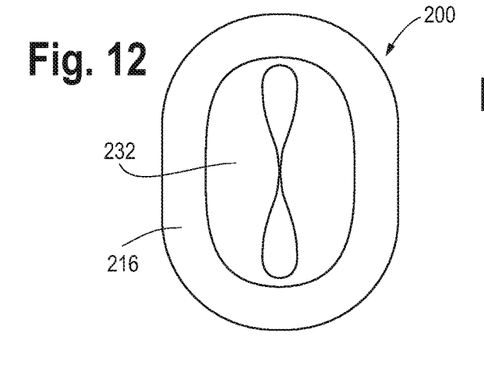
FIG. 12 illustrates a bottom view of the valve of FIG. 9.

FIGS. 1-4 illustrate an example of an as-molded, i.e., inverted, two-leaf duckbill valve 10 according to certain inventive techniques. The valve 10 has a hollow elastomeric body 12 with a first end 14 and a second end 18. A slightly concave cylindrical wall 22 extends from an edge 26 at the first end 14 to a generally oval shaped rib 30. The wall 22 defines a generally oval shaped opening 34 at the first end 14. A top surface 38 extends radially inward from the rib 30 to a generally dome or frustoconical shaped section 42. Two generally convex shaped portions 46 extend out from the section 42 and are located opposite each other. The portions 46 define an opening 50 at the second end 18 that generally has the shape of two slightly overlapping circles With reference to FIG. 5, the flexible as-molded valve 10 is ejected from the mold and then turned inside out (for example, by a machine or by hand on an assembly line) by pushing the second end 18 toward the first end 14 and through the opening 34 until the second end 18 cannot be pushed further. The geometries of the valve 10 are such that, after turning the valve 10 "inside out," the resulting structure is the "as-used" two-leaf duckbill valve 100 shown in FIGS. 6-8, which is an inverted version of the as-molded valve 10. The valve 100 has a hollow elastomeric body 104 with a first end 108 and a second end 112. Two tapered walls 116 located opposite each other converge toward the first end 108 to form an elongated slit 120 defined by lips 122. The tapered walls 116 are connected by two rounded, generally triangular walls 124 located opposite each other. The walls 116 and 124 extend from a cylindrical body portion 128. A circular shaped collar 132 extends from the body portion 128 to the second end 112. The collar 132 defines a circular opening 134 at the second end 112 of the valve 100. By inverting the as-molded valve 10 into the as-used valve 100, a hoop stress is applied along the elastomeric body 104 of the as-used valve 100. This hoop stress causes the opening 50 found in the as-molded valve 10 to be closed upon being inverted such that the lips 122 of the valve 100 are pressed together to close any opening. The result is the sealed slit 120.

Figure 41A:
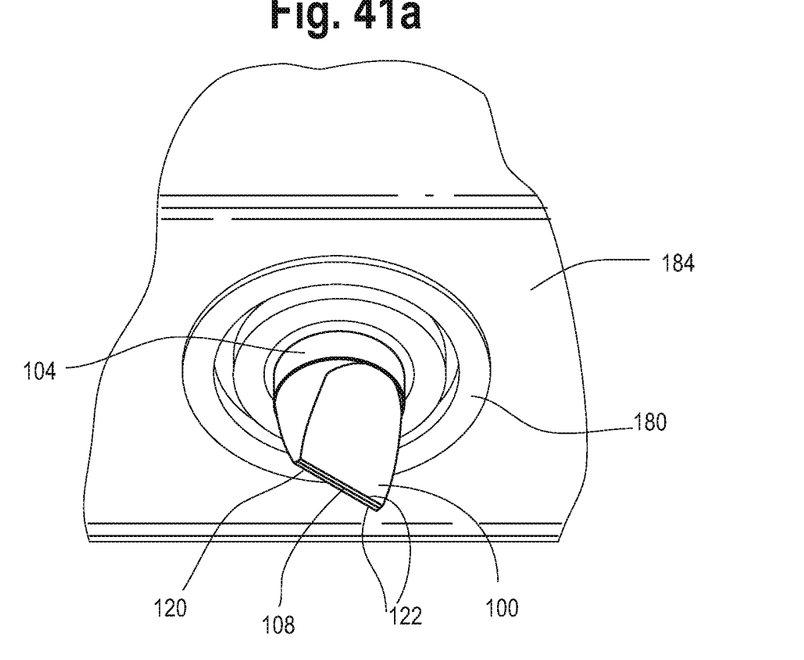
FIG. 41a illustrates an isometric view of the valve of FIGS. 5-8 being used in a valve assembly.
Figure 41B:
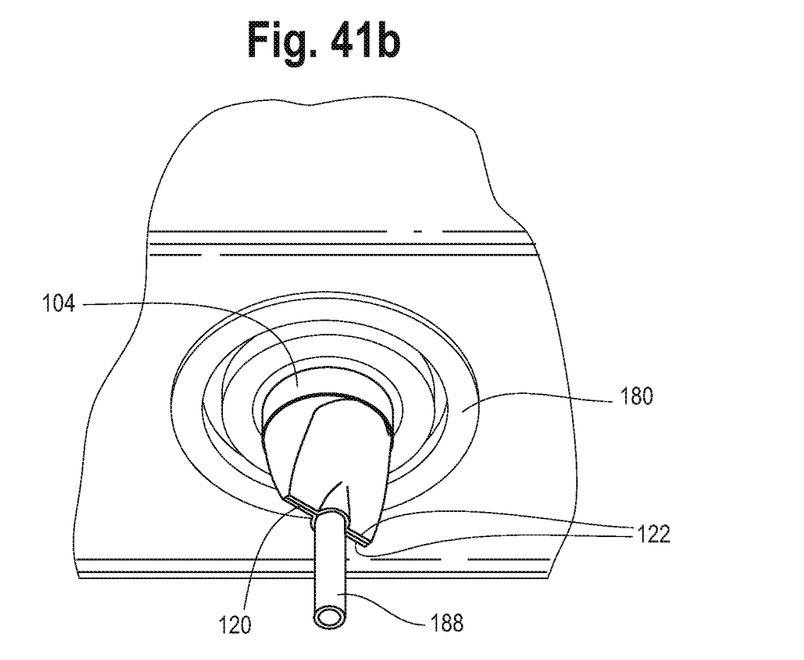
FIG. 41b illustrates an isometric view of the valve assembly of FIG. 41a being used with a dispensing tube.

FIGS. 41*a* and 41*b* show the valve 100 used in a valve assembly 180, with the first end 108 of the valve 100 extending into a bag or liner 184 filled with liquid. When the as-used valve 100 is used in a valve assembly 180, a probe 188 can be inserted into the hollow body 104 of the valve 100 through the opening 134 (FIG. 6) at the second end 112 (FIG. 6) of the valve 100 and through the slit 120. Due to the flexible nature of the valve 100 and the hoop stress applied to the lips 122, the lips 122 form a seal around the probe 188 as it extends through the slit 120. When the probe 188 is removed from the valve 100, the hoop stress in the valve 100 causes the lips 122 to be pressed back together and reseal along the slit 120. While FIGS. 41*a* and 41*b* show the two leaf duckbill valve 100 being used with a valve assembly 180 and probe 188, it is understood that the other valve embodiments disclosed herein can be used with a valve assembly and probe in a similar way.

FIGS. 9-12 illustrate an example of an as-molded, i.e., inverted, two-leaf duckbill valve 200 according to certain inventive techniques. The valve 200 has a hollow elastomeric body 204 with a first end 208 and a second end 212. A slightly concave oval shaped wall 216 extends from an edge 220 at the first end 208 to a generally oval shaped rib 228. The wall 216 defines a generally oval shaped opening 232 at the first end 208. A top surface 236 extends radially inward from the rib 228 to a generally dome or frustoconical shaped section 240. Two lips 244 extend out from the section 240 and are located opposite each other. The lips 244 define two openings 248 at the second end 212.

Figure 13:
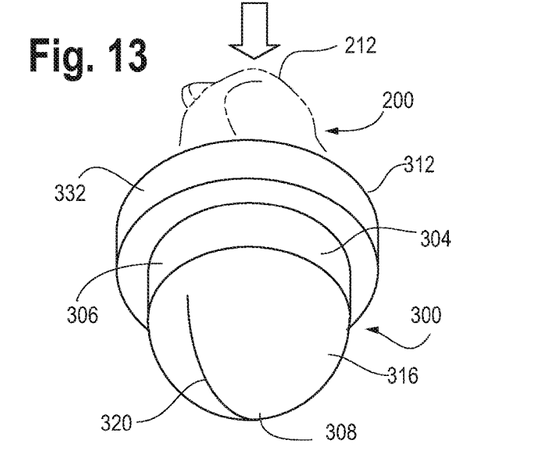
FIG. 13 illustrates an isometric view of the valve of FIG. 9 turned inside out to an as-used duckbill valve configuration.
Figure 14:
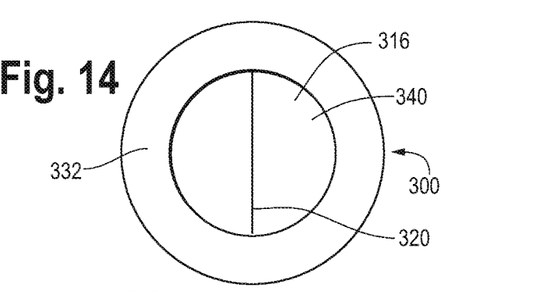
FIG. 14 illustrates a bottom view of the as-used valve of FIG. 13.
Figure 15:
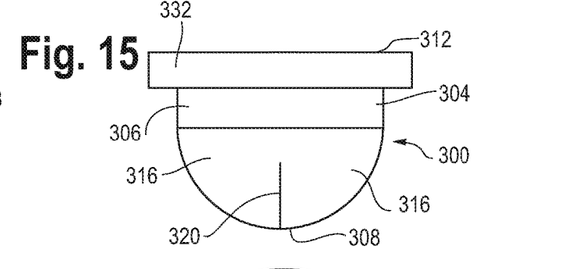
FIG. 15 illustrates a side view of the as-used valve of FIG. 13.
Figure 16:
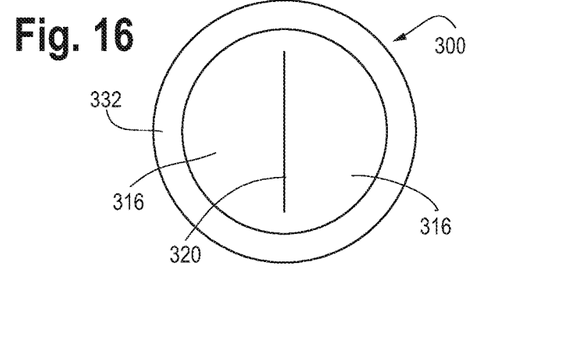
FIG. 16 illustrates a top view of the as-used valve of FIG. 13.
Figure 17:
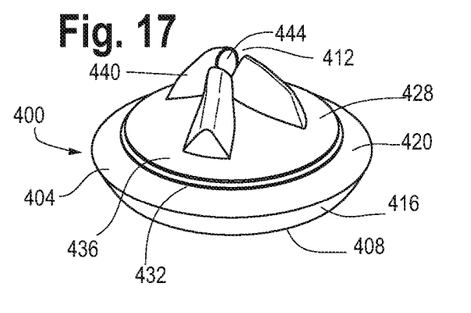
FIG. 17 illustrates an isometric view of an as-molded valve according to certain inventive techniques.
Figure 18:
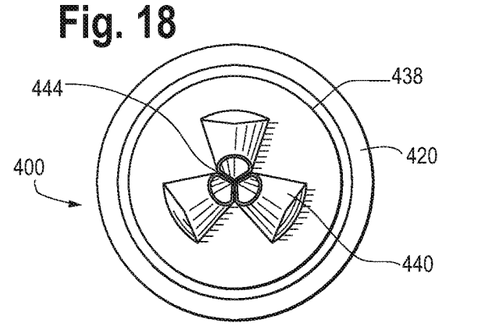
FIG. 18 illustrates a top view of the valve of FIG. 17.
Figure 19:
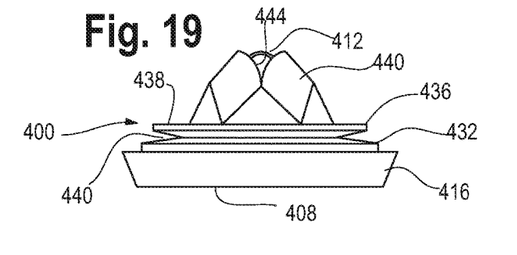
FIG. 19 illustrates a side view of the valve of FIG. 17.
Figure 20:
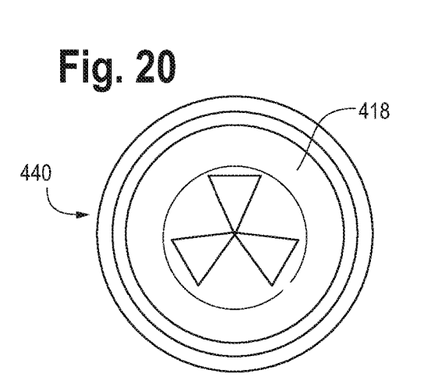
FIG. 20 illustrates a bottom view of the valve of FIG. 17.

With reference to FIG. 13, the flexible as-molded valve 200 is ejected from the mold and then turned inside out (for example, by a machine or by hand on an assembly line) by pushing the second end 212 toward the first end 208 and through the opening 232 until the second end 212 cannot be pushed further. The geometries of the valve 200 are such that, after turning the valve 200 "inside out," the resulting structure is the "as-used" two-leaf duckbill valve 300 shown in FIGS. 14-16, which is an inverted version of the as-molded valve 200. The valve 300 has a hollow elastomeric body 304 with a first end 308 and a second end 312. Two half-dome shaped walls 316 extend from a mid-section 306 and are located opposite each other. The walls 316 converge toward the first end 308 and define a curved, elongated slit 320. A circular shaped collar 332 extends from the mid-section 306 to the second end 312. By inverting the as-molded valve 200 into the as-used valve 300, a hoop stress is applied along the elastomeric body 304 of the as-used valve 300. This hoop stress causes the openings 248 (FIG. 10) found in the as-molded valve 200 to be closed upon being inverted such that the lips 244 (FIG. 10) of the valve 200 are pressed together to close any opening. The result is the sealed slit 320. When the as-used valve 300 is used in a valve assembly (like that shown in FIGS. 41*a* and 41*b*), a probe can be inserted into the valve body 304 through an opening 340 (FIG. 14) at the second end 312 of the valve 300 and through the slit 320. Due to the flexible nature of the valve 300 and the hoop stress applied to the walls 316, the walls 316 form a seal around the probe as it extends through the slit 320. When the probe is removed from the valve 300, the hoop stress in the valve 300 causes the walls 316 to be pressed back together to reform a seal.

FIGS. 17-20 illustrate an example of an as-molded, i.e., inverted, three-leaf duckbill valve 400 according to certain inventive techniques. The valve 400 has a hollow elastomeric body 404 with a first end 408 and a second end 412. A circular collar 416 extends radially outward and upward at an angle from the first end 408 to an annular top surface 420. The collar 416 defines a generally circle shaped opening 418 at the first end 408. A body portion 428 extends up from the top surface 420 and includes two disc shaped portions 432 and 436 connected such that there is annular gap 440 between outer edges of the portions 432 and 436. The top portion 436 has a slightly smaller diameter than the lower portion 432 and defines a rib portion 438. Three hollow, generally triangular shaped portions 440 extend up from the top portion 436 and define an opening 444.

Figure 21:
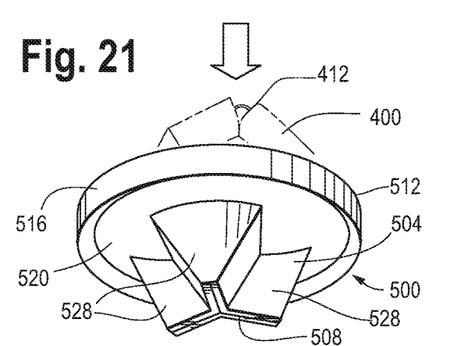
FIG. 21 illustrates an isometric view of the valve of FIG. 17 turned inside out to an as-used duckbill valve configuration.
Figure 22:
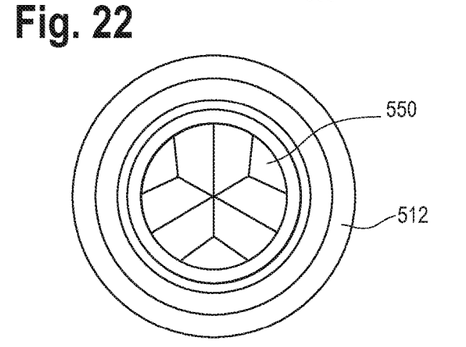
FIG. 22 illustrates a bottom view of the as-used valve of FIG. 21.
Figure 23:
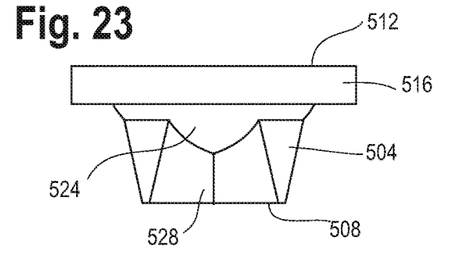
FIG. 23 illustrates a side view of the as-used valve of FIG. 21.
Figure 24:
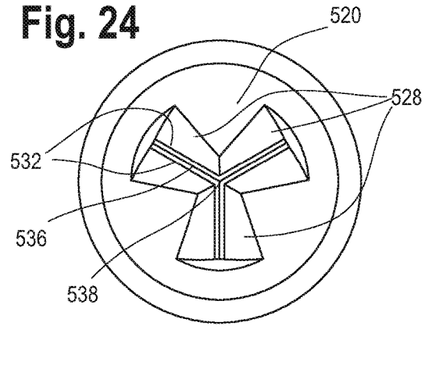
FIG. 24 illustrates a top view of the as-used valve of FIG. 21.
Figure 25:
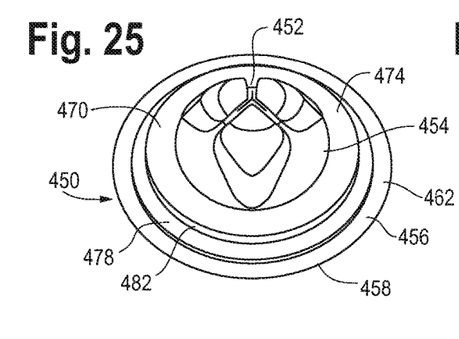
FIG. 25 illustrates an isometric view of an as-molded valve according to certain inventive techniques.
Figure 26:
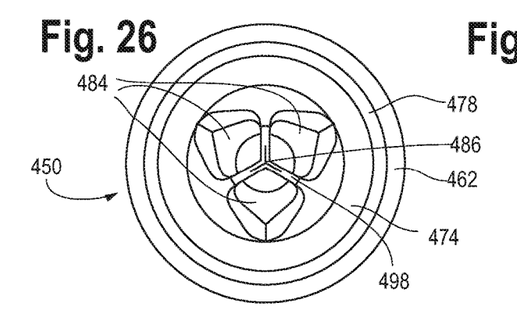
FIG. 26 illustrates a top view of the valve of FIG. 25.
Figure 27:
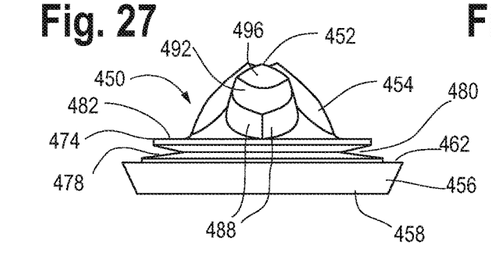
FIG. 27 illustrates a side view of the valve of FIG. 25.
Figure 28:
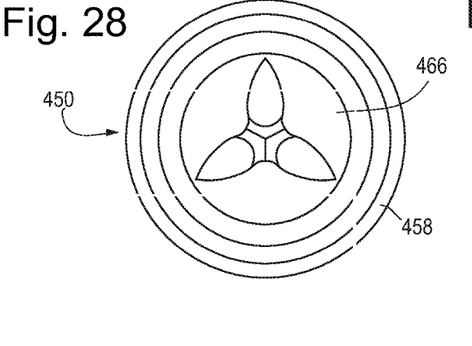
FIG. 28 illustrates a bottom view of the valve of FIG. 25.

With reference to FIG. 21, the flexible as-molded valve 400 is ejected from the mold and then turned inside out (for example, by a machine or by hand on an assembly line) by pushing the second end 412 toward the first end 408 and through the opening 418 until the second end 412 cannot be pushed further. The geometries of the valve 400 are such that, after turning the valve 400 "inside out," the resulting structure is the "as-used" three-leaf duckbill valve 500 shown in FIGS. 22-24, which is an inverted version of the as-molded valve 400. The valve 500 has hollow elastomeric body 504 with a first end 508 and a second end 512. A circular collar 516 extends from the second end 512. A top surface 520 extends radially inward from the collar 516. A dome shaped body portion 524 extends from the top surface 520, and three generally triangle shaped portions 528 extend from the body portion 524 to the first end 508. Each portion 528 includes a pair of lips 532 that define a sealed slit 536. The three slits 536 of the portions 528 intersect at a middle point at the first end 508 of the valve 500 to define a Y-shaped slit 538. By inverting the as-molded valve 400 into the as-used valve 500, a hoop stress is applied along the elastomeric body 504 of the as-used valve 400 (and in particular, along the rib portion 438 of the as-molded valve 400, which is now on the inside of the valve 500). This hoop stress causes the opening 444 (FIG. 17) found in the as-molded valve 400 to be closed upon being inverted such that the lips 532 of the valve 500 are pressed together to close any opening. The result is the sealed slits 536.

When the as-used valve 500 is used in a valve assembly (such as that shown in FIGS. 41*a* and 41*b*), a probe can be inserted into the valve body 504 through an opening 550 (FIG. 22) at the second end 512 of the valve 500 and through the slits 536/538. Due to the flexible nature of the valve 500 and the hoop stress applied to the portions 528 and lips 532 of the valve 500, the lips 532 form a seal around the probe as it extends through the slits 536/538. When the probe is removed from the valve 500, the hoop stress in the valve 500 causes the lips 532 to be pressed back together to reform a seal.

FIGS. 25-28 illustrate another example of an as-molded, i.e., inverted, three-leaf duckbill valve 450 according to certain inventive techniques. The valve 450 has a hollow elastomeric body 454 with a first end 458 and a second end 452. A circular collar 456 extends radially outward and upward at an angle from the first end 458 to an annular top surface 462. The collar 456 defines a generally circle shaped opening 466 at the first end 458. A body portion 470 extends up from the top surface 462 and includes two disc shaped portions 474 and 478 connected such that there is annular gap 480 between outer edges of the portions 474 and 478. The top portion 474 has a slightly smaller diameter than the lower portion 478 and defines a rib portion 482. Three hollow, generally triangular shaped portions 484 extend up from the top portion 474 and define a small slit or opening 486. Each portion 484 includes two lower surfaces 488 that extend upward and slightly inward and a middle surface 492 that extends inward and slightly upward from the two lower surfaces 488 to a top surface 496. Proximate the top surfaces 496 are lips 498 that define the opening 486.

Figure 29:
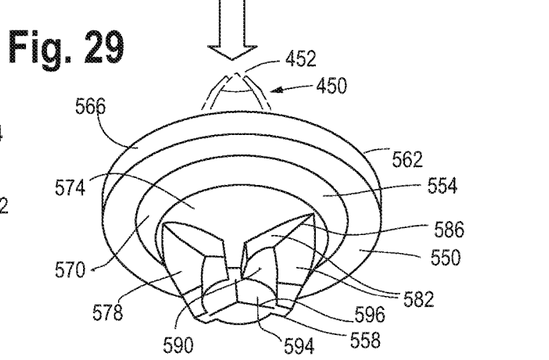
FIG. 29 illustrates an isometric view of the valve of FIG. 25 turned inside out to an as-used duckbill valve configuration.
Figure 30:
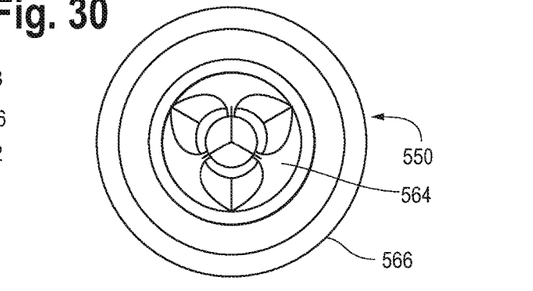
FIG. 30 illustrates a bottom view of the as-used valve of FIG. 29.
Figure 31:
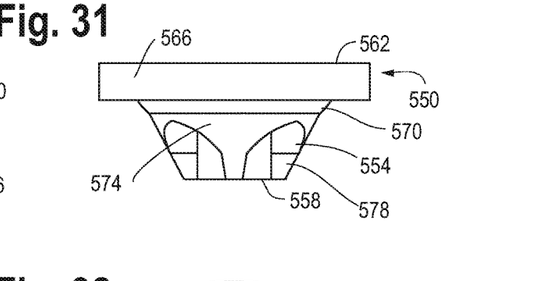
FIG. 31 illustrates a side view of the as-used valve of FIG. 29.
Figure 32:
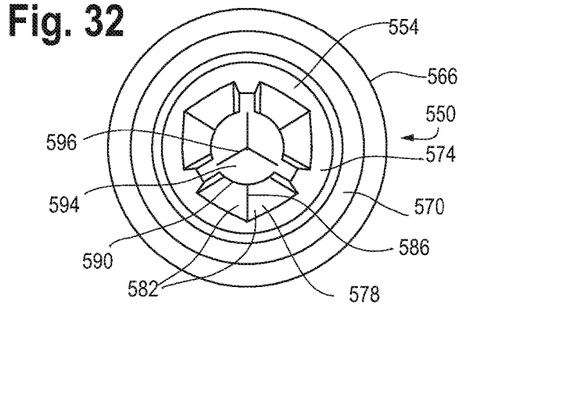
FIG. 32 illustrates a top view of the as-used valve of FIG. 29
Figure 33:
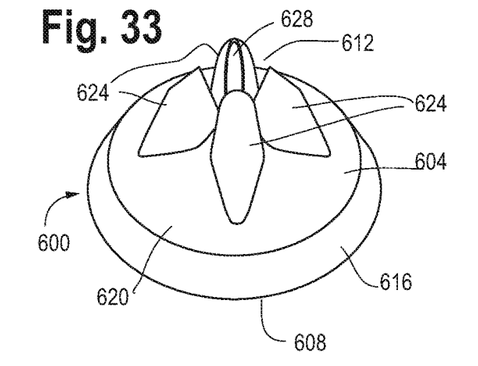
FIG. 33 illustrates an isometric view of an as-molded valve according to certain inventive techniques.
Figure 34:
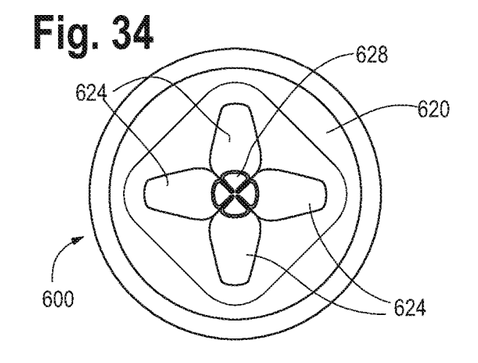
FIG. 34 illustrates a top view of the valve of FIG. 33.
Figure 35:
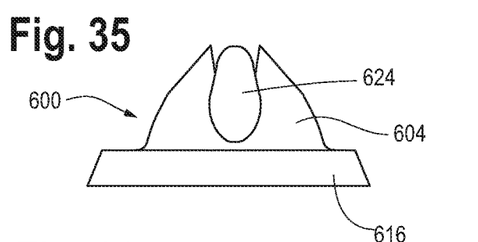
FIG. 35 illustrates a side view of the valve of FIG. 33.
Figure 36:
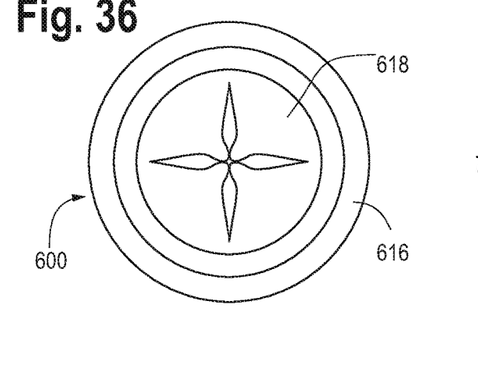
FIG. 36 illustrates a bottom view of the valve of FIG. 33.

With reference to FIG. 29, the flexible as-molded valve 450 is ejected from the mold and then turned inside out (for example, by a machine or by hand on an assembly line) by pushing the second end 452 toward the first end 458 and through the opening 466 until the second end 452 cannot be pushed further. The geometries of the valve 450 are such that, after turning the valve 450 "inside out," the resulting structure is the "as-used" three-leaf duckbill valve 550 shown in FIGS. 30-32, which is an inverted version of the as-molded valve 450. The valve 550 has hollow elastomeric body 554 with a first end 558 and a second end 562. A circular collar 566 extends from the second end 562. A top surface 570 extends radially inward from the collar 566. A dome shaped body portion 574 extends from the top surface 570. Three cut out portions 578 are located in the portion 574. The cutout portions 578 are defined by two generally triangular surfaces 582 that meet at a fold 586. A partially cylindrical shaped portion 590 extends from the triangular surfaces 582 to the first end 558 to form lips 594. The lips 594 of the cylindrical portions 590 define three slits 596 that intersect at a middle point at the first end 558 of the valve 550.

When the as-used valve 550 is used in a valve assembly (such as that shown in FIGS. 41a and 41b), a probe can be inserted into the valve body 554 through an opening 564 (FIG. 30) at the second end 562 of the valve 550 and through the slits 596. Due to the flexible nature of the valve 550 and the hoop stress applied to the portions 590 and lips 594 of the valve 550, the lips 594 form a seal around the probe as it extends through the slits 596. When the probe is removed from the valve 550, the hoop stress in the valve 550 causes the lips 596 to be pressed back together to reform a seal FIGS. 33-36 illustrate an example of an as-molded, i.e., inverted, four-leaf duckbill valve 600 according to certain inventive techniques. The valve 600 has a hollow elastomeric body 604 with a first end 608 and a second end 612. A circular collar 616 extends radially inward and upward at an angle from the first end 608. The collar 616 defines a generally circle shaped opening 618 at the first end 608 and extends upward to a top surface 620. Four hollow, hooded portions 624 extend up from the top surface 620 and define an opening 628. Each portion 624 is aligned opposite another portion 624 and is oriented orthogonally with respect to the other two portions 624.

Figure 37:
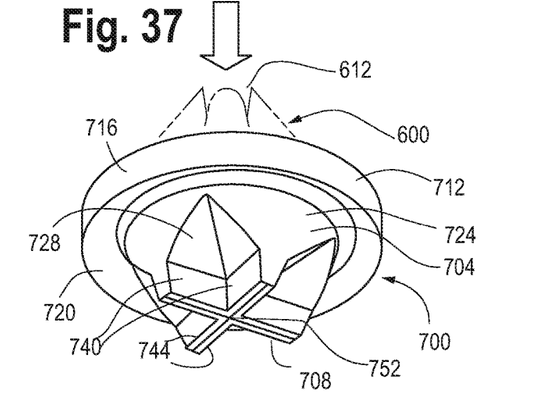
FIG. 37 illustrates an isometric view of the valve of FIG. 33 turned inside out to an as-used duckbill valve configuration.
Figure 38:
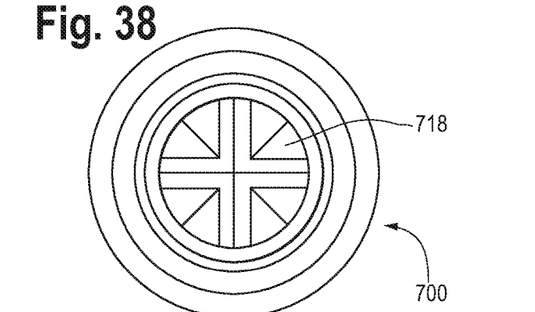
FIG. 38 illustrates a bottom view of the as-used valve of FIG. 37.
Figure 39:
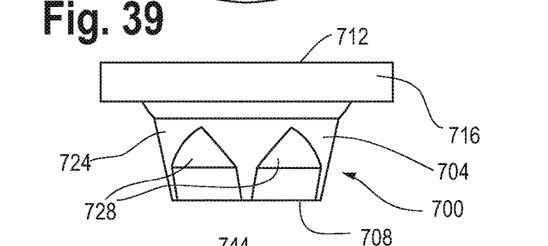
FIG. 39 illustrates a side view of the as-used valve of FIG. 37.
Figure 40:
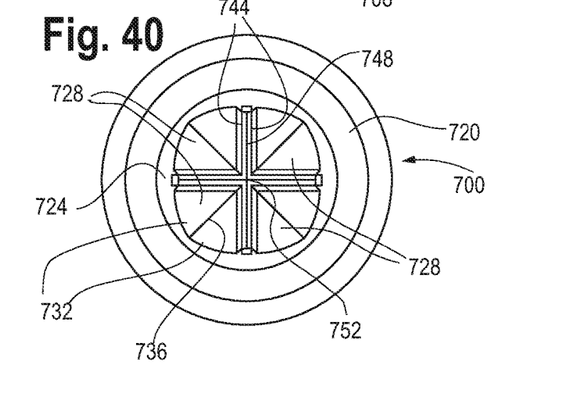
FIG. 40 illustrates a top view of the as-used valve of FIG. 37

With reference to FIG. 37, the flexible as-molded valve 600 is ejected from the mold and then turned inside out (for example, by a machine or by hand on an assembly line) by pushing the second end 612 toward the first end 608 and through the opening 618 until the second end 612 cannot be pushed further. The geometries of the valve 600 are such that, after turning the valve 600 "inside out," the resulting structure is the "as-used" four-leaf duckbill valve 700 shown in FIGS. 38-40, which is an inverted version of the as-molded valve 600. The valve 700 has a hollow elastomeric body 704 with a first end 708 and a second end 712. A circular collar 716 extends from the second end 712. A top surface 720 extends radially inward from the collar 716. A partial dome shaped body portion 724 extends from the top surface 720. Four cut out portions 728 are located in the portion 724. The cutout portions 728 are defined by two generally triangular surfaces 732 that meet at a fold 736. Two generally rectangular portions 740 extend from the triangular surfaces 732 to the first end 708 to form lips 744. The lips 744 of the rectangular portions 740 define four slits 748 that intersect at a middle point at the first end 708 of the valve 700 and form a cruciform slit 752.

By inverting the as-molded valve 600 into the as-used valve 700, a hoop stress is applied along the elastomeric body 704 of the as-used valve 700. This hoop stress causes the opening 628 found in the as-molded valve 600 to be closed upon being inverted such that the lips 744 of the valve 700 are pressed together to close any opening. The result is the sealed slits 748/752. When the as-used valve 700 is used in a valve assembly (such as that shown in FIGS. 41a and 41b), a probe can be inserted into the valve body 704 through an opening 718 (FIG. 38) at the second end 712 of the valve 700 and through the slits 748/752. Due to the flexible nature of the valve 700 and the hoop stress applied to the portions 724 and 728 and the lips 744, the lips 744 form a seal around the probe as it extends through the slits 748/752. When the probe is removed from the valve 700, the hoop stress in the valve 700 causes the lips 744 to be pressed back together to reform a seal.

In an alternative embodiment, the duckbill valve may include interlocking features that help hold the valve in its as-used configuration when inverted from the as-molded configuration. The interlocking features also help hold the slit of the valve in a sealed state when there is no probe going through the slit. The interlocking feature embodiments are shown in FIGS. 42-46 as part of a two-leaf duckbill valve of the present technology, but the interlocking features also can be used with other types of duckbill valves of the present technology, such as three and four leaf duckbill valves.

Figure 1:
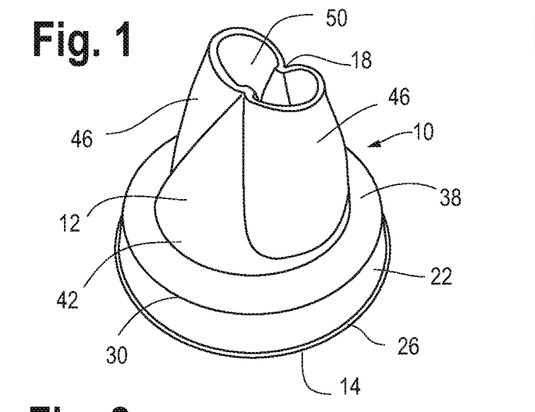
FIG. 1 illustrates an isometric view of an as-molded valve according to certain inventive techniques.
Figure 2:
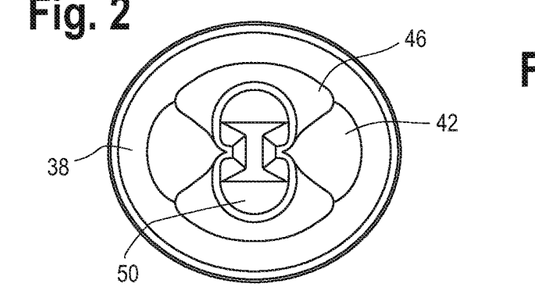
FIG. 2 illustrates a top view of the valve of FIG. 1.
Figure 3:
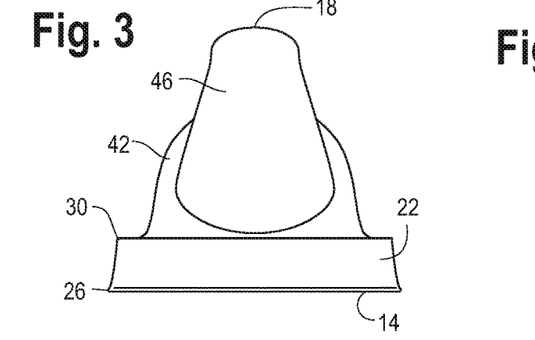
FIG. 3 illustrates a side view of the valve of FIG. 1.
Figure 4:
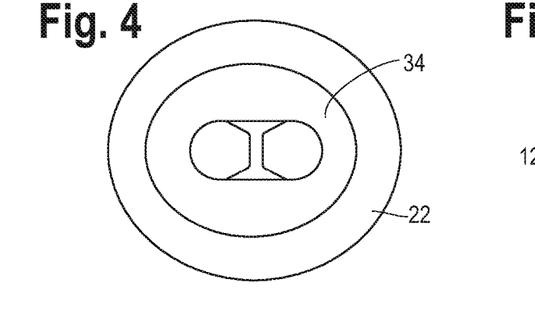
FIG. 4 illustrates a bottom view of the valve of FIG. 1.
Figures 5, 6:
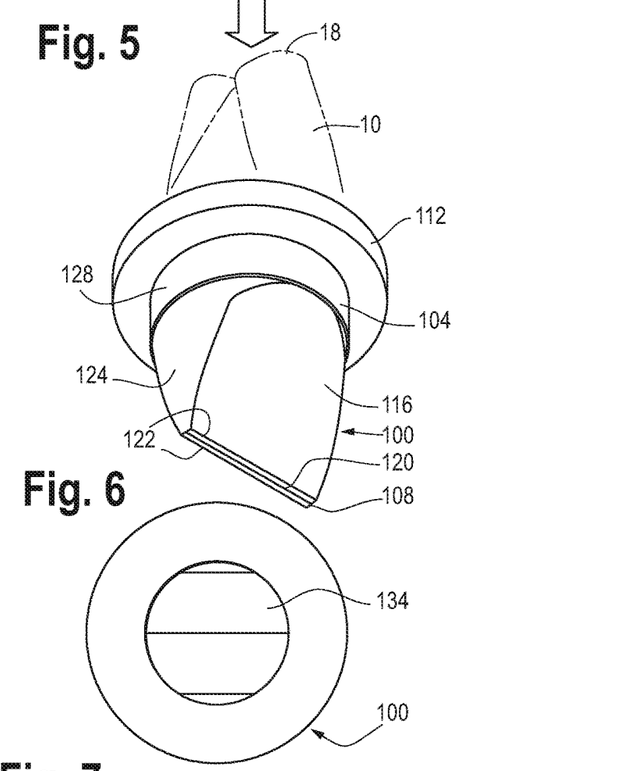
FIG. 5 illustrates an isometric view of the valve of FIG. 1 turned inside out to an as-used duckbill valve configuration.
FIG. 6 illustrates a bottom view of the as-used valve of FIG. 5.
Figure 42:
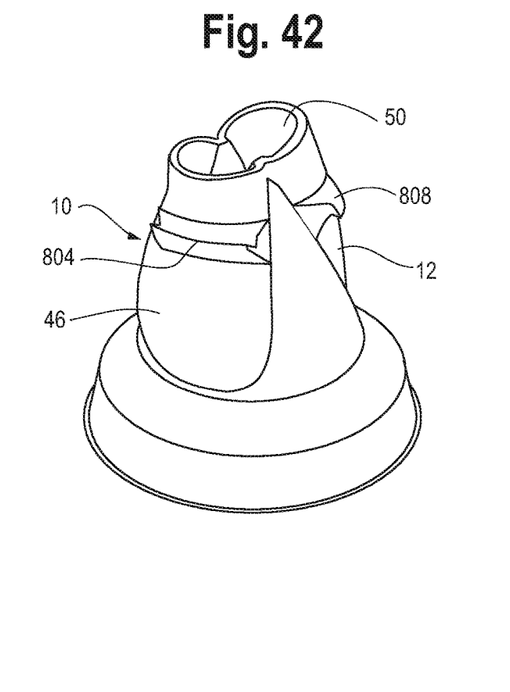
FIG. 42 illustrates an isometric view of an as-molded valve with interlocking features according to certain inventive techniques.

With reference to FIG. 42, the two-leaf duckbill valve 10 is shown in its as-molded configuration. A hooked tab 804 extends upwardly from one of the convex portions 46 of the valve 10, and another hooked tab 808 extends downwardly from the other convex portion 46 of the valve 10. When the valve 10 is turned inside out, the oppositely extending hooked tabs 804 and 808 engage and interlock with each other to help retain the valve 100 in its as-used configuration (FIG. 5). In that regard, when the tabs 804 and 808 interlock with each other, they hold the sides of the body 12 to which they are attached in a desired position with respect to each other. As part of doing so, the interlocked tabs 804 and 808 help keep the opening 50 of the valve 10 closed such that the as-used valve 100 has a sealed slit 108 (FIG. 5).

Figure 43:
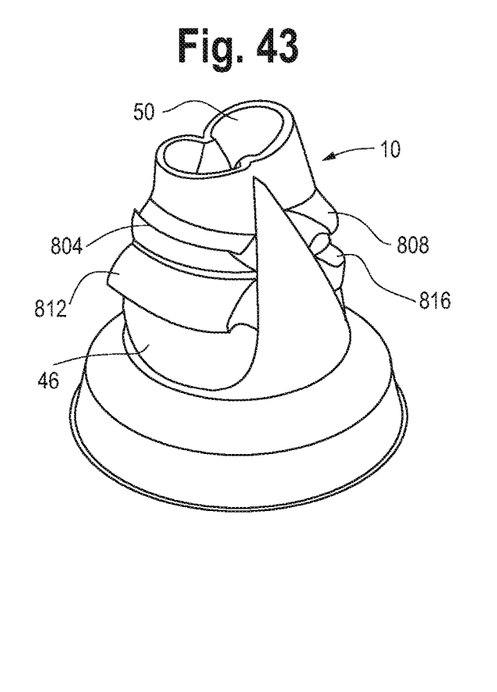
FIG. 43 illustrates an isometric view of an as-molded valve with interlocking features according to certain inventive techniques.

With respect to FIG. 43, the valve 10 includes the tabs 804 and 808 of the previous embodiment, and also includes a second set of hooked tabs 812 and 816. Tab 812 is below tab 804 and extends downwardly from one of the portions 46 of the valve 10. Tab 816 is below tab 808 and extends upwardly from the other portion 46 of the valve 10. When the valve 10 is turned inside out, the oppositely oriented hooked tabs 804 and 808 engage and interlock with each other and the oppositely oriented hooked tabs 812 and 816 engage and interlock with each other to help retain the valve 100 in its as-used configuration (FIG. 5). As part of doing so, the interlocked pairs of tabs 804 and 808 and 812 and 816 help keep the opening 50 of the valve 10 closed such that the valve 100 has a sealed slit 108 (FIG. 5).

Figure 44:
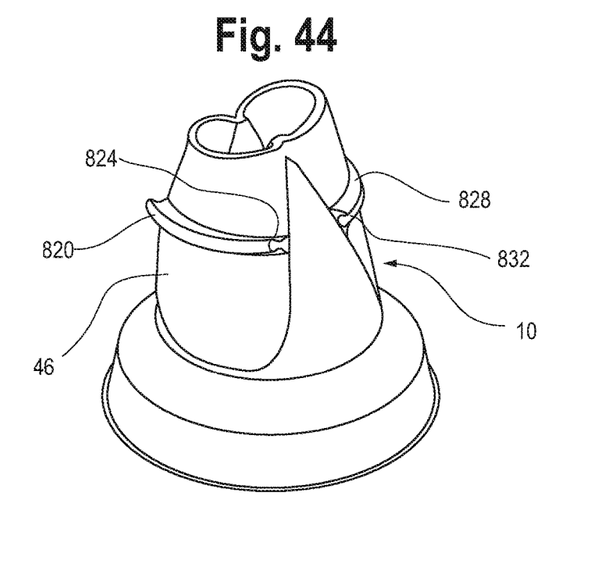
FIG. 44 illustrates an isometric view of an as-molded valve with interlocking features according to certain inventive techniques.

With respect to FIG. 44, the valve 10 includes a first tab 820 having a circular end 824 extending upwardly from one of the portions 46 and a second tab 828 having a rounded slot 832 extending from the other portion 46. When the valve 10 is turned inside out, the tabs 820 and 828 engage and interlock (with the end 824 being received in the slot 832) with each other to help retain the valve 100 in its as-used configuration (FIG. 5). As part of doing so, the interlocked tabs 820 and 828 help keep the opening 50 of the valve 10 closed such that the valve 100 has a sealed slit 108 (FIG. 5).

Figure 45:
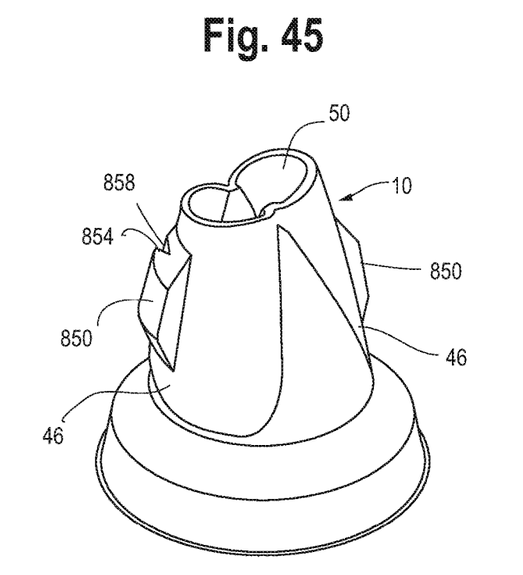
FIG. 45 illustrates an isometric view of an as-molded valve with interlocking features according to certain inventive techniques.

FIG. 45 shows the valve 10 with another embodiment of an interlocking mechanism. The interlocking mechanism includes two tabs 850 extending from the valve portions 46. Each tab 850 includes an edge 854 and a slot 858. When the valve 10 is turned inside out, the edge 854 of one of the tabs 850 is received in the slot 858 of the other tab 850. In this way, the tabs 850 engage and interlock with each other to help retain the valve 100 in its as-used configuration (FIG. 5). As part of doing so, the interlocked tabs 850 help keep the opening 50 of the valve 10 closed such that the valve 100 has a sealed slit 108 (FIG. 5).

Figure 46:
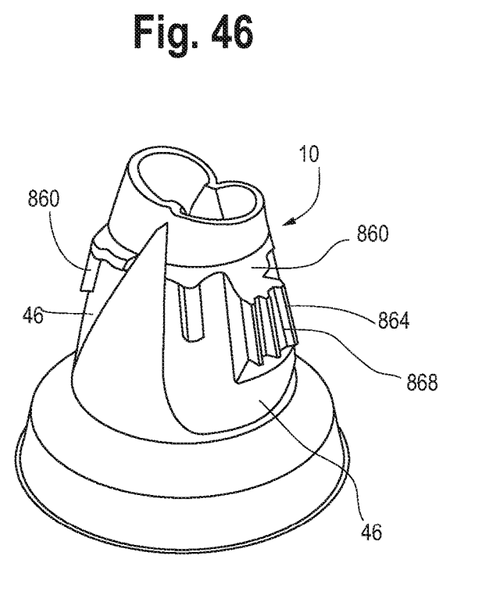
FIG. 46 illustrates an isometric view of an as-molded valve with interlocking features according to certain inventive techniques.

FIG. 46 illustrates another interlocking mechanism on the valve 10. The interlocking mechanism includes two tabs 860 extending from the valve portions 46. Each tab 860 includes ribs 864 and slots 868. When the valve 10 is turned inside out, the ribs 864 of one of the tabs 860 are received in the slots 868 of the other tab 860, and vice versa. In this way, the tabs 860 engage and interlock with each other to help retain the valve 100 in its as-used configuration (FIG. 5).

With respect to the interlocking mechanisms of FIGS. 42-46, when a probe (such as the one shown in FIG. 41b) is inverted into the as-used valve 100, the probe can pass between the interlocking tabs of the interlocking mechanisms, and the tabs of the interlocking mechanisms are contoured or configured to sealingly receive and engage the probe. For example, the tops and bottoms of the tabs may be angled such that, when the valve is inverted, the tabs guide the probe toward the slit and form a seal around the probe. When the probe is removed from the valve 100, the tabs of the interlocking mechanisms again engage each other and interlock. With respect to the interlocking mechanisms of FIG. 46, the use of the ribs helps reduce the amount of contact between the probe and the tabs, which helps prevent the valve inverting back into the as-molded configuration when the probe is removed from the valve in its as-used configuration.

The tabs of the interlocking mechanism embodiments may also be textured such that the tabs better engage each other when the valves are inverted to the as-used configuration. The tabs may also be contoured, oriented, configured, and/or textured in such a way so as to help prevent the as-used valve from being inverted back into the as-molded configuration when the probe is removed from the valve in its as-used configuration.

The duckbill valves of the different embodiments disclosed herein provide the advantage of being made without the need for scoring or cutting a slit or hole in the molded valve. Other types of duckbill valves besides the ones of the different embodiments may be made by the process disclosed herein.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A method for producing a duckbill valve, comprising:
   injecting an elastomer in a fluid state into a mold to form a flexible and hollow body having a first shape, wherein the body in the first shape has a first opening at a first end and a second opening at a second end;
   providing interlocking features on opposite sides of the body in the first shape and engaging the interlocking features when the body is inverted;
   ejecting the body in the first shape from the mold;
   inverting the body by moving the first end through the second opening at the second end to form a second shape, wherein the second shape has a first opening at a first end and has a slit at a second end, the slit being defined by lips that are pressed together to form a seal.

2. The method of claim 1, wherein the slit is defined by a pair of lips.

3. The method of claim 1, wherein the slit is Y-shaped and defined by three pairs of lips.

4. The method of claim 1, wherein the slit is cruciform shaped and defined by four pairs of lips.

5. The method of claim 1, wherein the valve is made of a thermoplastic elastomer.

6. The method of claim 1, wherein the slit is configured to be opened by a probe inserted into the valve and the lips are configured to form a seal around the probe.

7. The method of claim 1, wherein the valve is formed to have a circular rib, wherein, when the valve is inverted from the first shape to the second shape, the rib applies a hoop stress to the valve body such that the lips of the valve are pressed together in the second shape.

8. A method for producing a duckbill valve, comprising:
   injecting an elastomer in a fluid state into a mold to form a flexible and hollow body having a first shape, wherein the body in the first shape has a first opening at a first end and a second opening at a second end;
   ejecting the body in the first shape from the mold; and
   inverting the body by moving the first end through the second opening at the second end to form a second shape, wherein the second shape has a first opening at a first end and has a slit at a second end, the slit being defined by lips that are pressed together to form a seal, wherein the valve is formed to have a circular rib, wherein, when the valve is inverted from the first shape to the second shape, the rib applies a hoop stress to the valve body such that the lips of the valve are pressed together in the second shape.

9. The method of claim 8, wherein the slit is defined by a pair of lips.

10. The method of claim 8, wherein the slit is Y-shaped and defined by three pairs of lips.

11. The method of claim 8, wherein the slit is cruciform shaped and defined by four pairs of lips.

12. The method of claim 8, wherein the valve is made of a thermoplastic elastomer.

13. The method of claim 8, wherein the slit is configured to be opened by a probe inserted into the valve and the lips are configured to form a seal around the probe.

* * * * *